Figure 2:
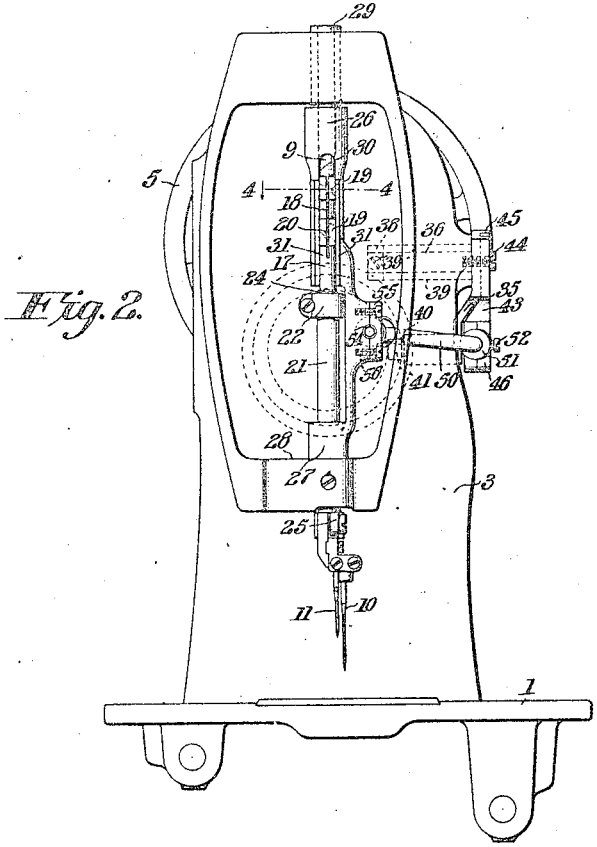

C. M. ABERCROMBIE.
POWER TRANSMITTING CONNECTION.
APPLICATION FILED JULY 24, 1915.
1,231,110.
Patented June 26, 1917.
2 SHEETS—SHEET 1.
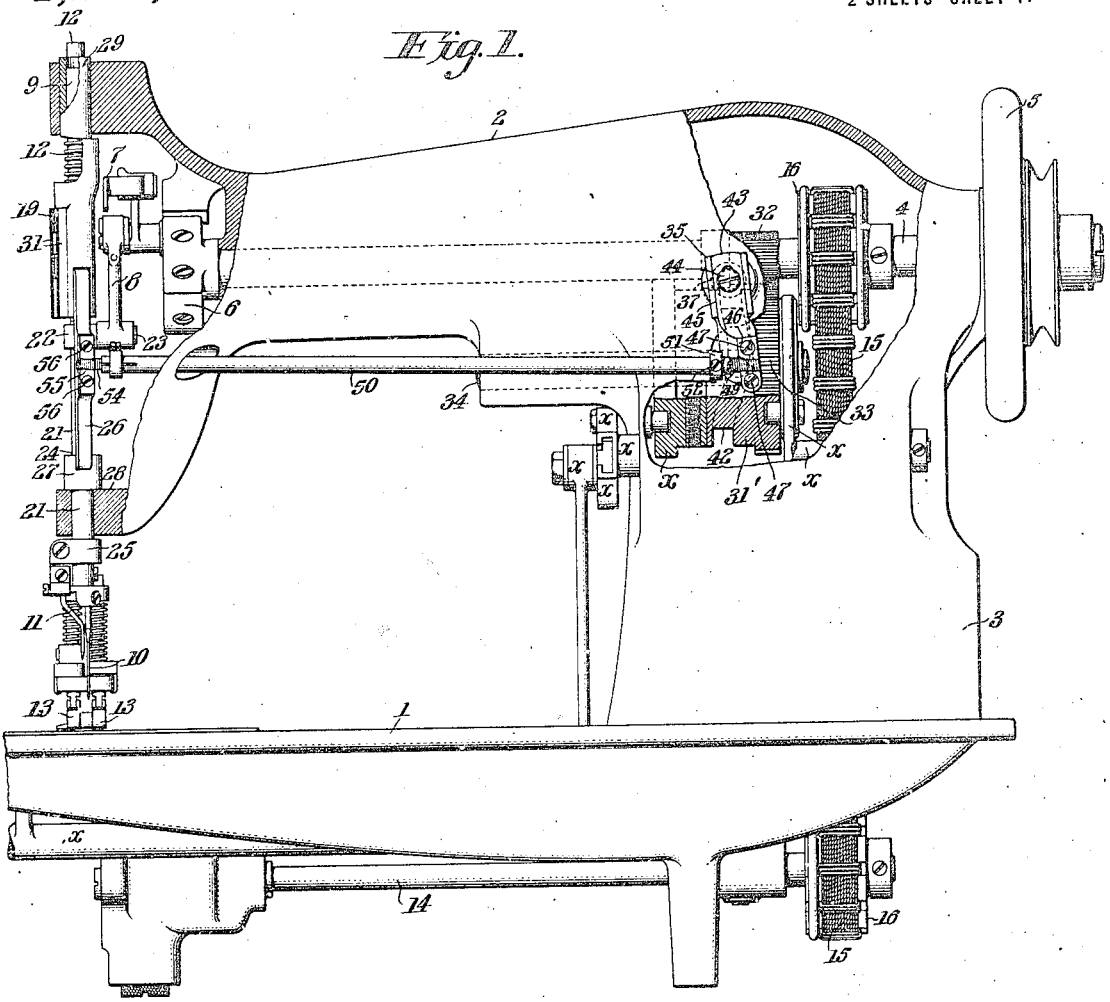
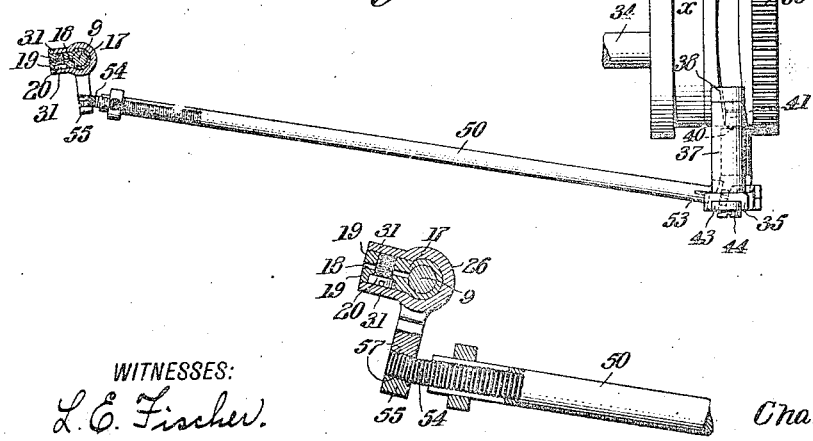
WITNESSES:
L. E. Fischer.
Géza L. Terna
INVENTOR
Charles M. Abercrombie
BY
F. W. Ostrom
ATTORNEY C. M. ABERCROMBIE.
POWER TRANSMITTING CONNECTION.
APPLICATION FILED JULY 24, 1915.

1,231,110.

Patented June 26, 1917.
2 SHEETS—SHEET 2.

WITNESSES:
L. E. Fischer
Géza L. Turna

INVENTOR
Charles M. Abercrombie
BY F. N. Ashton
ATTORNEY

UNITED STATES PATENT OFFICE.

CHARLES M. ABERCROMBIE, OF BRIDGEPORT, CONNECTICUT, ASSIGNOR TO THE SINGER MANUFACTURING COMPANY, A CORPORATION OF NEW JERSEY.

POWER-TRANSMITTING CONNECTION.

1,231,110.

Specification of Letters Patent.  Patented June 26, 1917.

Application filed July 24, 1915.  Serial No. 41,657.

*To all whom it may concern:*

Be it known that I, CHARLES M. ABERCROMBIE, citizen of the United States, residing at Bridgeport, in the county of Fairfield and State of Connecticut, have invented certain new and useful Improvements in Power-Transmitting Connections, of which the following is a specification, reference being had therein to the accompanying drawings.

This invention relates to improvements in power transmitting connections and has for its object to provide a pitman having a rigid portion resiliently connected at one or both of its opposite ends with axially mounted power transmitting elements, said rigid portion and resilient connection or connections comprising a positively driven and driving pitman for transmitting power in directions at an angle to the direction of the length of said rigid portion, when in its dead center positions of reverse movement, or at a continuously changing angle in its sequence of movements.

Prior to the present invention it has been the common practice, when transmitting power at an angle to the plane of action of the pitman driving and driven elements, to employ the, so termed, "ball and socket connection," which latter is difficult of accurate construction, of adjustment to compensate for wear and of initial adjustment to meet the requirements of angular power transmission, as above noted. There has also been employed driving connections constructed of separate rigid portions jointed together by a flat spring disposed in the line of power transmission so as to be rigid in that direction but flexible in the transverse direction. It is believed that the present construction of pitman is the first to employ yielding means capable of power transmission at any angle oblique to the axis of the rigid portion.

For a better understanding of the utility of the present pitman under conditions of power transmission at an angle to the plane in which its driving and driven elements are actuated, it is preferably herein shown and described in connection with one form of well known variety of Singer sewing machine wherein a vibratory lever, actuated from the main or needle-bar driving shaft, transmits, through the pitman, oscillatory movements to the needle carrying bar in planes at an angle to the normal position of the axis of the resilient connection arranged at one or the opposite ends of the rigid portion of the pitman.

Figure 5:
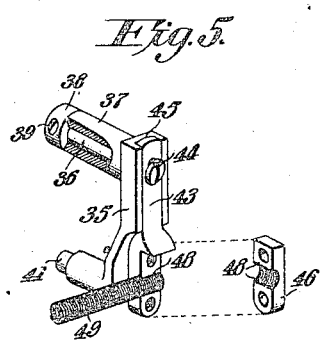

In the accompanying drawings, which form a part of the specification, Figure 1 is a view in front side elevation of a sewing machine equipped with the present invention. Fig. 2 is a front end elevation of the sewing machine bracket arm and bed-plate, together with so much of the stitch-forming mechanism as is essential to an understanding of the application of the present invention. Fig. 3 is a detail of the present pitman operatively connected at one end with its actuating element and at its opposite end with its actuated element. Fig. 4 is a view showing the front end portion of the pitman in section and operatively connected with the means for transmitting oscillatory movements to the needle bar, said means comprising a yoke shown in section on line 4—4, Fig. 2, and broken out in the point at which the pitman is secured to said yoke, and Fig. 5 is a perspective of the pitman driving element showing the means for securing to the latter one of the resilient pitman members whose opposite end is secured in the rigid portion of the pitman.

As the present invention is not limited in its application to sewing machines, as herein shown, only such reference will be made to the machine elements as is necessary for a proper understanding of its application.

Referring to the figures, 1 represents the bed-plate of the sewing machine upon which is mounted the bracket arm comprising the arm bracket 2 and standard 3, 4 the main or needle bar actuating shaft carrying at one end the band wheel 5 and at its opposite end the shaft flange 6, to which latter is operatively connected the take-up 7 and, through the link 8, the needle-bar 9, said needle-bar being provided with the usual needle 10 and fabric piercing element 11, the latter common to hemstitch sewing machines to which class the present variety of machine belongs. 12 denotes the spring-depressed cloth-presser carrying bar provided with cloth-pressers, as 13, 14 the loop-taker actuating shaft operatively connected, through common means, with one form of commonly employed loop-taker (not shown), said shaft being operatively connected with the main shaft 4 through the commonly employed belt 15 and pulleys, as 16.

In the present construction, as in machines of its class, to effect a hemstitch seam the fabric is given two forward and one return feed movement for each hemstitch figure, and as the means herein illustrated for effecting such feed movements is not important to an understanding of the application and function of the present invention, it is thought sufficient to designate the elements by the letter $x$.

The needle-bar 9 carries a tubular portion 17 provided with a slot 18 and lugs, as 19, screws, as 20, acting to secure said tubular portion to move with the needle-bar and loosely surrounding the lower end portion of the latter is a second tubular portion 21 provided at its upper end with a pinch collar 22 having a stud 23 connected with the lower end of the needle-bar actuating link 8, said second tubular portion being arranged between the lower end 24 of the tubular portion 17 and the upper surface of the pinch collar 25 carrying the fabric piercer 11, thus transmitting from the main-shaft to the needle-bar oppositely directed vertical movements.

26 represents a yoke provided at its lower end with a lug 27 seated upon the stationary wall 28 of the head of the bracket-arm and through which the tubular portion 21 moves vertically, the opposite end of said yoke being fulcrumed upon the needle-bar and held against vertical movement by the suitably secured needle-bar bushing 29. 30 denotes a guide-way formed in said yoke between the walls, as 31, of which track the lugs 19, the latter, through the oscillatory movements of said yoke by means later to be explained, transmit oscillatory movements to the needle-bar, thus causing the needle to be reciprocated in different vertical planes.

32 represents a gear member carried by the main-shaft 4 which meshes with a gear member 33 mounted to rotate on a shaft 34 suitably secured in the bracket-arm, the ratio of said gears being as 1 to 3, the same as is common to machines of the present class.

35 represents a crank-arm provided with a fulcrum pin 36 journaled in the bushing 37 suitably secured in the bracket-arm, a collar 38 secured by screw 39 on the inner end of said pin, together with said bushing, acting to hold said pin against lengthwise movement, the crank-arm at its lower end being provided with a stud 40 carrying a cam-roller 41 tracking a groove 42 in the cam 31' carried by the gear-member 33, said cam-groove acting on said cam-roller to effect swinging movements of the crank-arm.

Having pointed out the construction and operation of the means for demonstrating the operation of the invention, the construction and function of the latter will now be described.

43 represents a spring securing bracket adjustably held by screw 44, in a guideway 45 formed in the crank-arm 35, to which latter is secured by cap 46, screws as 47 and threaded surfaces, as 48, one end a spiral-spring 49 whose opposite end is threaded into the rigid portion 50 of the pitman and held against accidental movement by the collar 51 and screw 52 acting on the split portion 53 of said rigid portion, the front end of the latter being provided with a spiral-spring 54 secured at one end in the pitman in like manner as spring 49, the opposite end of the spring 54 being operatively connected with the yoke 26 by cap 55, screws as 56 and threaded surfaces, as 57.

In the construction of a pitman as herein pointed out, the springs are preferably formed with the coils of wire arranged in juxtaposed relationship, and the resilient strength of said springs in the direction of their length must be greater than is required for transmitting the power so that the springs will yield only in directions at an angle to the axis of the rigid portion of the pitman. It is evident that in transmitting power from a swinging to a sliding element, only that end of the rigid portion of the pitman operatively connected with the swinging element would employ the spring connection.

Having thus set forth the nature of the invention, what I claim herein is:—

1. A power-transmitting connection, having in combination an endwise movable rigid portion provided at one end with a resilient tubular element comprising helicoidal windings of wire of contiguous convolutions, the co-efficient of elasticity of said element in the direction of its length being such that its resistance to strain is in excess of the motive power required to actuate said connection.

2. A power-transmitting connection, having in combination a rigid portion provided at one end with a resilient tubular element comprising helicoidal windings of wire of contiguous convolutions, and means for actuating said connection in the direction of its length, the co-efficient of elasticity of said element in the direction of its length being such that its resistance to strain is in excess of the motive power required to actuate said connection.

3. A power-transmitting connection, having in combination a rigid portion provided at one end with a resilient tubular element comprising helicoidal windings of wire of contiguous convolutions, and means acting on said tubular element to give to said rigid portion oppositely directed lengthwise movements, the co-efficient of elasticity of said element in the direction of its length being such that its resistance to strain is in excess of the motive power required to actuate said connection.

4. A power-transmitting connection, having in combination a rigid portion provided at one end with a resilient tubular element comprising helicoidal windings of wire of contiguous convolutions, and a crank-arm acting on said tubular element to give to said rigid portion oppositely directed lengthwise movements, the co-efficient of elasticity of said element in the direction of its length being such that its resistance to strain is in excess of the motive power required to actuate said connection.

In testimony whereof, I have signed my name to this specification, in the presence of two subscribing witnesses.

CHARLES M. ABERCROMBIE.

Witnesses:
A. S. BUNNELL,
J. A. HAYWARD.